United States Patent
Hochstetter et al.

(10) Patent No.: US 11,225,607 B2
(45) Date of Patent: Jan. 18, 2022

(54) THERMOPLASTIC COMPOSITION AND PREPREG, COMPOSITE MATERIAL MADE OF SAID PREPREG, AND USES OF SAID COMPOSITE MATERIAL

(71) Applicant: Arkema France, Colombes (FR)

(72) Inventors: Gilles Hochstetter, L'hay les Roses (FR); Marc Audenaert, Bernay (FR); Sébastien Taillemite, Chaville (FR)

(73) Assignee: Arkema France, Colombes (FR)

( * ) Notice: Subject to any disclaimer, the term of this patent is extended or adjusted under 35 U.S.C. 154(b) by 466 days.

(21) Appl. No.: 15/556,051

(22) PCT Filed: Mar. 10, 2016

(86) PCT No.: PCT/FR2016/050545
§ 371 (c)(1),
(2) Date: Sep. 6, 2017

(87) PCT Pub. No.: WO2016/142630
PCT Pub. Date: Sep. 15, 2016

(65) Prior Publication Data
US 2018/0057748 A1     Mar. 1, 2018

(30) Foreign Application Priority Data

Mar. 10, 2015   (FR) ..................................... 1551977

(51) Int. Cl.
| | |
|---|---|
| C09K 21/14 | (2006.01) |
| C08L 27/12 | (2006.01) |
| C08K 3/40 | (2006.01) |
| C08K 3/36 | (2006.01) |
| C08K 3/38 | (2006.01) |
| C08K 5/00 | (2006.01) |
| C08K 3/04 | (2006.01) |
| C08K 3/016 | (2018.01) |

(52) U.S. Cl.
CPC ............... *C09K 21/14* (2013.01); *C08K 3/04* (2013.01); *C08K 3/36* (2013.01); *C08K 3/38* (2013.01); *C08K 3/40* (2013.01); *C08K 5/0016* (2013.01); *C08L 27/12* (2013.01); *C08K 3/016* (2018.01); *C08L 2201/02* (2013.01)

(58) Field of Classification Search
None
See application file for complete search history.

(56) References Cited

U.S. PATENT DOCUMENTS

| | | | |
|---|---|---|---|
| 4,749,610 A | 6/1988 | Katsuragawa et al. | |
| 7,220,790 B2 * | 5/2007 | Seidel | C08K 5/0066 524/127 |
| 8,883,898 B2 | 11/2014 | Hochstetter et al. | |
| 10,513,054 B2 * | 12/2019 | Dehondt | B29B 15/08 |
| 2004/0059031 A1 * | 3/2004 | Seidel | C08K 5/523 524/121 |
| 2010/0159181 A1 | 6/2010 | Kelmartin et al. | |
| 2011/0166278 A1 | 7/2011 | Hochstetter et al. | |
| 2014/0316063 A1 | 10/2014 | Hochstetter et al. | |
| 2017/0246766 A1 * | 8/2017 | Dehondt | B29B 15/08 |

* cited by examiner

*Primary Examiner* — Joseph D Anthony
(74) *Attorney, Agent, or Firm* — Thoms F. Roland

(57) ABSTRACT

The present invention relates to the field of thermoplastic composite materials. Specifically, the invention relates to a fluorinated, flame-retardant thermoplastic composition, to the prepreg prepared from said composition, to the composite material containing said prepreg, to the methods enabling manufacture, and to the uses of said material. The invention also relates to the use of a thermoplastic prepreg for manufacturing fire-resistant composite materials.

16 Claims, No Drawings

THERMOPLASTIC COMPOSITION AND PREPREG, COMPOSITE MATERIAL MADE OF SAID PREPREG, AND USES OF SAID COMPOSITE MATERIAL

This application claims benefit, under U.S.C. § 119 or § 365 of PCT Application Number PCT/FR2016/050545, filed Mar. 10, 2016, and French Patent Application Number FR1551977, filed Mar. 10, 2015, these documents being incorporated herein by reference.

FIELD OF THE INVENTION

The present invention relates to the field of thermoplastic composite materials. The invention more particularly relates to a fluorinated flame retardant thermoplastic composition, to the prepreg prepared from this composition and to the composite material containing said prepreg and also to the processes enabling the manufacture, and to the uses, of said material. In addition, the invention relates to the use of a thermoplastic prepreg for the manufacture of fire-resistant composite materials.

TECHNICAL BACKGROUND

Parts made of composite material used for fitting out the interior of planes, trains, boats and buses, and also for public buildings, must meet, inter alia, standards associated with the fire behavior of the material. These standards especially take into account the fire reaction, the smoke emission, the toxicity of the smoke, and the heat released by the materials during a fire. These standards aim to ensure optimum safety for users of the means of transport or of the building, by enabling them to evacuate the place in which a fire breaks out, which requires that the materials constituting same do not contribute to the development of the fire and do not generate smoke, or that the combustion products are not toxic. Among these standards, mention may be made, by way of examples, of EN 45545 which applies to the rail transport industry, FAR 25.853 and the corresponding AITMs for the aeronautical industry, IMO MSC 653 and 61 for the marine industry and ASTM E84 for construction.

In the case of the most restrictive standards, especially for fitting out the interior of planes, boats or trains in some countries, only composite materials based on phenolic resins may be used. However, these phenolic resins have numerous drawbacks, namely: the toxicity of the components making it possible to mold the parts, due to the presence of phenol and formaldehyde in the resin and to the presence of highly corrosive acid in the hardener; the low level of mechanical performance of the parts, especially the low flexural and shear stresses; the low resistance to UV, the absence of ways to recycle the parts at the end of their life or production waste; the difficulty of assembling parts to attach to the composite material based on phenolic resin; the low adhesion of paints or adhesives, necessitating the use of a primer, and the relatively short stability of the phenolic prepregs, of a few months, with the necessity for temperature-controlled storage.

Polyphenylene sulfide resins may also be used, but their very high cost limits the use thereof in the aeronautical sector. Moreover, the use of these resins poses problems due to their availability only in the form of sheets reinforced with a fibrous reinforcer, which only makes possible the molding of parts with a relatively simple form, to the very high molding temperature required to soften the resin, typically of greater than 300° C., to the low adhesion of paints, to their low resistance to UV, and to their low strength.

There is therefore still a need to develop novel composite materials which overcome the abovementioned drawbacks.

The applicant has already described, for example in the documents EP 2160 275 and EP 2 586 585, the preparation of various thermoplastic composite materials having high mechanical performance properties, in particular in terms of modulus, hot creep resistance and stress at break, which hardly change up to a temperature of at least 90° C. These materials are intended for the manufacture of mechanical or structural parts such as the nose, wing or cockpit of rockets or airplanes; offshore flexible pipe reinforcements; motor vehicle bodywork components, motor vehicle engine chassis components or support parts; or else structural components in the field of construction, or bridges and roadways.

It has now been found that, by selecting from several parameters characterizing known thermoplastic composite materials, it is possible to provide novel compositions and composite materials having, in addition to good mechanical properties, noteworthy fire resistance properties and good smoke and toxicity properties, making them suitable especially for the manufacture of parts for semi-structural applications for fitting out the interior of planes, trains, boats and buses, and also for public buildings.

SUMMARY OF THE INVENTION

The invention firstly relates to a flame retardant composition comprising a fluorinated thermoplastic polymer grafted with a polar carboxylic function and a fibrous reinforcer consisting of at least one continuous inorganic or organic fiber.

According to one embodiment, this grafted fluorinated polymer may be obtained by grafting at least one polar carboxylic monomer, bearing for example at least one carboxylic acid or anhydride function, to a fluorinated polymer.

According to one embodiment, said continuous inorganic or organic fiber is unidirectional and has an aspect ratio of greater than 1000.

According to a second aspect, a subject of the invention is a thermoplastic prepreg consisting of said flame retardant composition.

According to one embodiment, the content by weight of said inorganic or organic fibers in the prepreg is between 30 and 90%, preferably between 40 and 80%, advantageously between 45 and 65% and even more preferentially between 50 and 60%.

According to another aspect, the invention relates to a composite material comprising said prepreg.

According to one embodiment, this composite material is of monolithic type, that is to say that it consists solely of the prepreg.

According to another embodiment, this composite material is of sandwich type, comprising a core material between two skins consisting of prepreg.

Another aspect of the invention targets different processes for manufacturing the composite material of the invention, namely continuous lamination in the case of two-dimensional parts, and vacuum molding and thermo-compression in the case of three-dimensional parts.

Another subject of the invention is the use of said composite materials for the manufacture of molded or laminated parts in the aeronautical, naval, rail or road transport fields or the field of construction, in particular said parts being structural or mechanical parts.

According to yet another aspect, the invention relates to the use of a prepreg comprising a thermoplastic polymer and a fibrous reinforcer consisting of at least one unidirectional continuous fiber for the manufacture of fire-resistant composite materials.

According to one embodiment, said thermoplastic polymer is a fluorinated polymer, a polyamide, a polyolefin, especially polypropylene, a polyester or a copolymer or a mixture between at least two of these polymers. According to one embodiment, said thermoplastic polymer is a fluorinated polymer, especially a polymer based on vinylidene fluoride (VDF).

According to one embodiment, said continuous fiber is chosen from glass, carbon or aramid fibers and natural fibers such as flax, hemp or sisal.

DESCRIPTION OF EMBODIMENTS OF THE INVENTION

The invention is now described in greater detail and in a nonlimiting manner in the description which follows.

The invention provides a flame retardant composition comprising a fluorinated thermoplastic polymer grafted with a polar carboxylic function and a fibrous reinforcer consisting of at least one continuous inorganic or organic fiber.

According to one embodiment, this grafted fluorinated polymer is prepared according to a process comprising: (a) mixing, preferably in the molten state, a fluorinated polymer with a polar monomer bearing a carboxylic acid or anhydride function, (b) optionally converting this mixture into granules, powder, a film or a sheet, (c) irradiating this mixture, optionally in the absence of oxygen, under a dose ranging from 1 to 15 Mrad of photon or electron irradiation, to carry out the grafting of the polar monomer to the fluorinated polymer, and (d) optionally eliminating the residual polar monomer which has not reacted with the fluorinated polymer. A preparation process of this type is especially described in application EP 1484 346.

According to one embodiment, said fluorinated polymer is a "PVDF" resin, this term here equally covering a poly(vinylidene fluoride) homopolymer or a copolymer of vinylidene fluoride (VDF) and of at least one other comonomer chosen from vinyl fluoride, trifluoroethylene, chlorotrifluoroethylene, 1,2-difluoroethylene, tetrafluoroethylene, hexafluoropropylene, perfluoro(methylvinyl)ether, perfluoro(ethylvinyl)ether and perfluoro(propylvinyl)ether, wherein the VDF represents at least 50% by weight.

The polar carboxylic function grafted to the fluorinated polymer is borne by at least one polar monomer chosen from unsaturated monocarboxylic and dicarboxylic acids having from 2 to 20 carbon atoms, and in particular from 4 to 10 carbon atoms, such as acrylic, methacrylic, maleic, fumaric, itaconic, citraconic, allylsuccinic, cyclohex-4-ene-1,2-dicarboxylic, 4-methylcyclohex-4-ene-1,2-dicarboxylic, bicyclo(2,2,1)hept-5-ene-2,3-dicarboxylic and undecylenic acids and the anhydrides thereof.

The inorganic or organic fiber present in the composition is chosen from: carbon fibers; silica fibers such as glass fibers, especially of E, R or S2 type; boron fibers; ceramic fibers, especially silicon carbide, boron carbide, boron carbonitride, silicon nitride, boron nitride; basalt fibers; fibers or filaments based on metals and alloys thereof; fibers based on metal oxides; natural fibers such as flax, hemp or sisal fibers; metallized carbon fibers and metallized glass fibers or mixtures of the fibers mentioned.

According to one embodiment, said inorganic or organic fiber is chosen from glass and carbon fibers.

According to one embodiment, said continuous inorganic or organic fiber is unidirectional and has an aspect ratio (ratio of length to diameter of the fiber) of greater than 1000. The fibers may be used as is, in the form of unidirectional threads, or after a step of weaving in the form of a fabric consisting of a multidirectional fiber network (2D, 3D or other).

The composition according to the invention may also contain one or more additives, chosen from plasticizers, dyes, antistatic agents, flame retardants and lubricants.

According to a second aspect, a subject of the invention is a thermoplastic prepreg consisting of said flame retardant composition. This thermoplastic prepreg consists of one or more thermoplastic plies. A thermoplastic ply comprises a fibrous reinforcer which is a unidirectional strip of continuous fibers without any overlap between the fibers and a thermoplastic polymer as matrix impregnating the mass of said fibrous reinforcer. This thermoplastic ply is in roll form, with a width of between 5 and 1500 mm, preferentially between 25 and 1000 mm, and more advantageously between 100 and 800 mm. This thermoplastic ply has a thickness of between 0.1 mm and 0.7 mm, preferentially between 0.15 and 0.5 mm, and more advantageously between 0.2 and 0.4 mm. This thermoplastic prepreg is manufactured by lamination or thermo-compression of said thermoplastic plies. When the thermoplastic prepreg comprises several thermoplastic plies, the continuous fibers of the different plies may either all be oriented in the same direction (0°), or be oriented perpendicularly (0°-90°), or be oriented with specific angles chosen for the mechanical characteristics that they confer upon the finished part, such as 0°-45° for example. This prepreg benefits from high mechanical performance properties by virtue of the lack of overlap of said fibers between the different plies. This thermoplastic prepreg is in roll form, with a width of between 5 and 3000 mm, preferentially between 20 and 1500 mm, and more advantageously between 100 and 1300 mm, and a length greater than 100 meters, preferentially greater than 500 meters, and more advantageously greater than 1000 meters. These dimensions ensure optimum conditions in terms of productivity for the manufacturer of the composite material.

In the prepreg according to the invention, the content by weight of said inorganic or organic fibers is between 30 and 90%, preferably between 40 and 80%, advantageously between 45 and 65% and even more preferentially between 50 and 60%.

The advantage of prepregs based on PVDF resin is firstly their good fire properties and also, most unexpectedly, their good smoke and toxicity properties. Indeed, the level of HF (hydrofluoric acid) emission during the combustion of a composite material comprising said prepreg is far below the maximum level permitted according to standards FAR 25.853 and AITM 3.0005.

Another advantage of prepregs based on PVDF resin is the possibility of molding sandwich materials with a foam made of PVDF or a honeycomb made of PVDF, by thermowelding the prepreg based on PVDF resin with said foam or said honeycomb, thereby ensuring perfect compatibility between the skins and the core material. Said foam or said honeycomb made of PVDF have a thermoplastic character, which enables thermoforming of the core material for parts having a complex form.

Another advantage of prepregs based on PVDF resin is the low melting point (170° C.) of the latter, which makes it possible to carry out low-temperature molding, unlike polyphenylene sulfide resin, within a very short time, due to the absence of chemical reaction during consolidation, unlike phenolic resins.

Another advantage of prepregs based on PVDF resin is the possibility of assembling parts to attach to the composite material produced from said prepreg, by welding injected parts made of short fiber compounds based on PVDF resin instead of adhesive bonding, which is complex, or screwing, these parts to attach.

Another advantage of prepregs based on PVDF resin, used in combination or not with a core material made of PVDF, is the possibility of recycling, due to the thermoplastic nature of the resin. It is especially possible to recycle waste from the production of the composite materials produced with said prepreg, and also the parts at the end of their life. One way of recycling consists of grinding this waste or end-of-life parts and compounding this ground matter with PVDF granules in order to obtain a compound based on PVDF resin and on short fibers. This compound thus constitutes a way of recycling the fiber and the PVDF matrix.

Another advantage of prepregs based on PVDF resin is their very long stability, of several years, or even of several decades, without temperature-controlled storage.

Another advantage of prepregs based on PVDF resin is the possibility of painting or adhesively bonding, using acrylic adhesives or paints.

Another advantage of prepregs based on PVDF resin is their very high chemical resistance and their exceptional UV resistance, and hence the exceptional length of life conferred upon the composite material.

Another advantage of the prepregs based on PVDF resin is the possibility of molding a composite material by covering it with a decorative film in order to improve the finished appearance of the part, and also the strength thereof. Films based on PVDF resin or Tedlar® are particularly suited to this application.

Another aspect of the invention thus consists of a composite material comprising the prepreg described above. Monolithic or sandwich composite materials may be manufactured from these prepregs. A monolithic composite material only consists of prepreg, whereas a sandwich composite material comprises a core material between two skins consisting of prepreg. As core material, mention may be made of foams and honeycombs, which make it possible to lighten the part while retaining a high level of rigidity.

Another aspect of the invention targets different processes for manufacturing the composite material of the invention, namely continuous lamination in the case of two-dimensional parts, and vacuum molding and thermo-compression in the case of three-dimensional parts.

Continuous lamination enables the continuous manufacture of monolithic or sandwich panels in a rolling mill exerting a weak pressure, between 0.1 and 3 bar, preferably between 0.5 and 2 bar, and at a temperature of between 180° C. and 240° C., preferably between 190 and 220° C.

Vacuum molding enables the manufacture of monolithic or sandwich parts with a simple or complex form. The part is molded between a rigid mold and a flexible cover, between which a vacuum is created (between 0.1 mbar and 900 mbar, preferably between 1 mbar and 200 mbar), and at a temperature of between 180° C. and 240° C., preferably between 190 and 220° C. The rigid mold may be made of composite material or of metal. The flexible cover may be a silicone cover or a thermoplastic film (polyamide, polyimide, etc.).

Thermo-compression enables the manufacture of monolithic or sandwich parts with a simple or complex form. The part is molded between a rigid mold and a rigid countermold, between which a pressure is applied (between 0.1 bar and 50 bar, preferably between 1 bar and 15 bar), and at a temperature of between 180° C. and 240° C., preferably between 190 and 220° C. The mold is generally made of metal.

These composite materials are used for the manufacture of molded or laminated parts in the aeronautical, naval, rail or road transport fields or the field of construction, said parts being structural (requiring a modulus of greater than 15 GPa) or semi-structural (the modulus of which is between 8 and 15 GPa) mechanical parts.

According to another aspect, the invention relates to the use of a prepreg comprising a thermoplastic polymer and a fibrous reinforcer consisting of at least one unidirectional continuous fiber for the manufacture of fire-resistant composite materials.

Said thermoplastic polymer is chosen from fluorinated polymers, polyamides, polyolefins, especially polypropylene, polyesters, or copolymers or mixtures between at least two of these polymers.

According to one embodiment, said thermoplastic polymer is a "PVDF" resin, this term here equally covering a poly(vinylidene fluoride) homopolymer or a copolymer of vinylidene fluoride (VDF) and of at least one other comonomer chosen from vinyl fluoride, trifluoroethylene, chlorotrifluoroethylene, 1,2-difluoroethylene, tetrafluoroethylene, hexafluoropropylene, perfluoro(methylvinyl)ether, perfluoro(ethylvinyl)ether and perfluoro(propylvinyl)ether, wherein the VDF represents at least 50% by weight.

According to one embodiment, the PVDF is grafted by a polar carboxylic function borne by at least one polar monomer chosen from unsaturated monocarboxylic and dicarboxylic acids having from 2 to 20 carbon atoms, and in particular from 4 to 10 carbon atoms, such as acrylic, methacrylic, maleic, fumaric, itaconic, citraconic, allylsuccinic, cyclohex-4-ene-1,2-dicarboxylic, 4-methylcyclohex-4-ene-1,2-dicarboxylic, bicyclo(2,2,1)hept-5-ene-2,3-dicarboxylic and undecylenic acids and the anhydrides thereof.

According to another embodiment, the PVDF is not grafted.

The continuous fiber forming part of the composition of said prepreg is chosen from glass, carbon or aramid fibers and natural fibers such as flax, hemp or sisal. The content by weight of said fibers is between 30 and 90%, preferably between 40 and 80%, advantageously between 45 and 65% and even more preferentially between 50 and 60%, relative to the total weight of the prepreg.

It has been observed that the hydrofluoric acid emissions during combustion of said prepreg are less than 200 ppm, preferentially less than 100 ppm and more preferentially less than 50 ppm, according to standards FAR 25.853 and AITM 3.0005. This makes it most particularly suitable for the manufacture of parts for:

fitting out the interior of planes, trains, boats, buses: seats, partitions, interior facings, flooring, cockpit furniture, passenger cabin furniture, carts, equipment in technical areas, ballistic protection, including exterior, bathrooms, toilets;

parts for construction: ventilation equipment, ballistic protection, interior or exterior equipment and facings, components participating in the structure of the building.

Examples

The following examples illustrate the invention without limiting it.

Prepregs were produced from a PVDF homopolymer grafted with approximately 0.6% maleic anhydride and a continuous fiber, by dusting then thermo-compression under 10 bar for 15 minutes. The amounts of HF emitted during this operation were measured according to standard AITM 3.0005. The values obtained are presented in Table 1.

TABLE 1

| Type of continuous fiber | Thermo-compression temperature | Fiber content | Thickness of prepreg | HF emissions |
|---|---|---|---|---|
| Flax | 230° C. | 45% | 1.8 mm | <30 ppm |
| Carbon | 200° C. | 50% | 1.2 mm | <20 ppm |

The invention claimed is:

1. A thermoplastic prepreg consisting of a flame retardant composite composition comprising a fluorinated thermoplastic polymer grafted with a polar carboxylic function and a fibrous reinforcer consisting of at least one continuous inorganic or organic fiber, wherein the content by weight of said inorganic or organic fibers is between 40 and 80 wt %, and wherein said thermoplastic prepreg consists of one or more thermoplastic plies, each thermoplastic ply comprising a unidirectional strip of continuous fibers without any overlap between the fibers and a thermoplastic polymer as matrix impregnating the mass of said fibrous reinforcer.

2. The as claimed in claim 1, wherein said fluorinated polymer is a poly(vinylidene fluoride) (PVDF) or a copolymer of vinylidene fluoride and of at least one other comonomer chosen from vinyl fluoride, trifluoroethylene, chlorotrifluoroethylene, 1,2-difluoroethylene, tetrafluoroethylene, hexafluoropropylene, perfluoro(methylvinyl)ether, perfluoro(ethylvinyl)ether and perfluoro(propylvinyl)ether, wherein the vinylidene fluoride represents at least 50% by weight.

3. The prepreg as claimed claim 1 wherein said inorganic or organic fiber is selected from the group consisting of: carbon fibers; silica fibers, glass fibers, E type glass, R type glass, S2 type glass; boron fibers; ceramic fibers, silicon carbide, boron carbide, boron carbonitride, silicon nitride, boron nitride; basalt fibers; fibers or filaments based on metals and alloys thereof; fibers based on metal oxides; natural fibers, flax, hemp and sisal fibers; metallized carbon fibers and metallized glass fibers, and mixtures thereof.

4. The prepreg as claimed in claim 1, wherein said continuous inorganic or organic fiber is unidirectional and has an aspect ratio of greater than 1000.

5. The prepreg as claimed in claim 1, wherein the flame retardant composite composition comprises one or more additives selected from the group consisting of plasticizers, dyes, antistatic agents, flame retardants and lubricants.

6. The prepreg as claimed in claim 1, wherein said polar carboxylic function is borne by at least one polar monomer selected from the group consisting of unsaturated monocarboxylic and dicarboxylic acids having from 2 to 20 carbon atoms, acrylic acid, methacrylic acid, maleic acid, fumaric acid, itaconic acid, citraconic acid, allylsuccinic acid, cyclohex-4-ene-1,2-dicarboxylic acid, 4-methylcyclohex-4-ene-1,2-dicarboxylic acid, bicyclo(2,2,1)hept-5-ene-2,3-dicarboxylic acid and undecylenic acid and the anhydrides thereof.

7. The prepreg as claimed in any of claims 1 to 6, wherein the content by weight of said inorganic or organic fibers is between 45 and 65%.

8. The prepreg as claimed in any one of claims 1 to 6, wherein the content by weight of said inorganic or organic fibers is between 50 and 60%.

9. A composite material comprising the prepreg as claimed in claim 7.

10. The composite material as claimed in claim 9, in the form of a monolithic panel consisting of said prepreg.

11. The composite material as claimed in claim 9, comprising a core material sandwiched between at least two of said prepregs, serving as skins.

12. The composite material as claimed in claim 11, wherein said core material is a foam material, or a honeycomb material.

13. A process for manufacturing a composite material as claimed in claim 9 by a continuous lamination technique, under a pressure of 0.1 to 3 bar, and at a temperature ranging from 180 to 240° C.

14. The process for manufacturing a composite material as claimed in claim 9 by the vacuum molding technique using a rigid mold made of composite or made of metal, and a flexible cover, with a reduced pressure ranging from 0.1 to 900 mbar, and at a temperature ranging from 180 to 240° C.

15. The process for manufacturing a composite material as claimed in claim 9 by the thermo-compression molding technique in a metal mold, with a pressure ranging from 0.1 to 50 bar and at a temperature of from 180 to 240° C.

16. The composite material of claim 9 wherein said composite material is a part for aeronautical, naval, rail or road transportation construction, structural or semi-structural mechanical parts.

* * * * *